June 26, 1951 H. CHIREIX 2,558,604

BROAD BAND FREQUENCY DISCRIMINATOR

Filed March 25, 1948

INVENTOR
HENRI CHIREIX
By Haseltine, Lake & Co
AGENTS

Patented June 26, 1951 2,558,604

UNITED STATES PATENT OFFICE 2,558,604

BROAD BAND FREQUENCY DISCRIMINATOR

Henri Chireix, Paris, France, assignor to Societe Française Radio-Electrique, a corporation of France Application March 25, 1948, Serial No. 16,966
In France April 15, 1947
1 Claim. (Cl. 250—27)

The present invention relates to frequency discriminators, particularly for use in apparatus requiring a great width of discrimination relatively to the band width.

Figure 1:
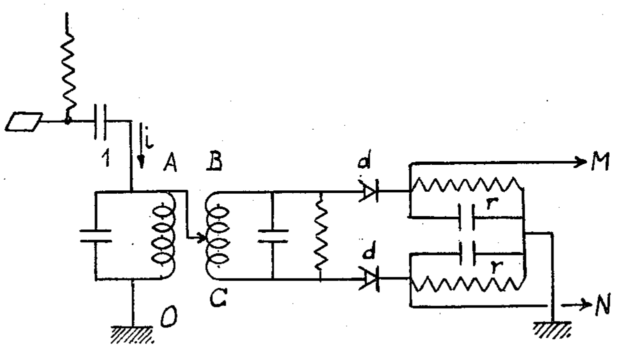
Fig. 1 shows diagrammatically what is generally used in the art.

For the purpose of demodulating a frequency modulated wave, use is often made of a type of discriminator the installation of which agrees in principle with that of Fig. 1.

Said discriminator is supplied with constant current $i$, the current $i$ being furnished by an amplitude limiter of which only the anodic circuit 1 is shown.

It comprises essentially two coupled circuits, a primary and a secondary, of which the latter is tuned to the mid-frequency to be discriminated, and delivers to two detectors $d$ loaded by equal resistances $r$. The discriminated and detected potential is collected at NM.

Figure 2:
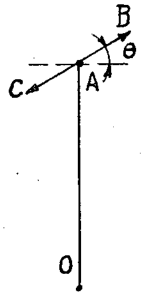
Fig. 2 shows how the circuit of Fig. 1 operates.

The well-known mode of operation of this arrangement is shown in Fig. 2. Let OA be the potential at the terminals of the winding of the primary circuit, BC the potential at the terminals of the secondary circuit. One of the detectors is subjected with respect to the middle of the secondary winding to the resultant potential $\vec{OA}+\vec{AB}=\vec{OB}$, the other to the potential $\vec{OA}-\vec{AC}=\vec{OC}$, so that the potential collected in MN is proportional to $|OB|-|OC|$. In particular it is zero on the tuning of the secondary circuit, $\vec{BC}$ being in quadrature with $\vec{OA}$.

This classical circuit involves numerous defects when an attempt is made to apply it to a perfectly linear discriminator (harmonic distortion lower than 50 to 60 decibels), and to the discrimination of a deeply modulated wave (relative deviations higher than 5 or 10%).

Correct operation assumes indeed: that $\vec{OA}$ and $\vec{AB}$, $\vec{AC}$ remain constant in modulus when the frequency varies in the frequency band to be covered, that $\vec{AB}=-\vec{AC}$, that the relation $$\left|\frac{OA}{BC}\right|$$

is greater than 5 for example, or smaller than ⅕, and that sin $\theta$ is strictly proportional to the instantaneous frequency deviation. As none of these conditions (except the one relating to the value of $$\left|\frac{OA}{BC}\right|$$

can in effect be satisfied with sufficient precision, such a discriminator can offer acceptable results only when more or less close compensations are made.

Figure 3:
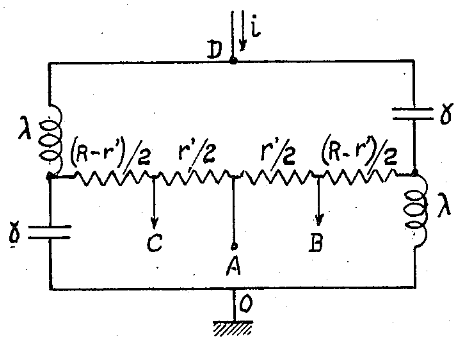
Fig. 3 shows the basic circuit according to the invention.

In the present invention, the various defects are eliminated by employing, instead of two coupled circuits as in Fig. 1, the bridge of Fig. 3 consisting of two identical inductances $\lambda$ and two identical capacities $\gamma$, forming a unit resonating with the pulsation $$\omega_0=\frac{1}{\sqrt{\lambda\gamma}}$$

Said bridge is closed on its characteristic impedance $$R=\sqrt{\frac{\lambda}{\gamma}}$$

constituted by a pure resistance, the two detectors being connected to terminals B and C, symmetrical with respect to the mid-point A and including between them a part $r$ of the resistance R; this bridge is supplied by the constant current $i$. The result is that at all frequencies $$|OA|=\frac{Ri}{2}$$

$$\vec{AB}=-\vec{AC}$$

$$|AB|=|AC|=\frac{r'}{R}|OA|=\frac{r'i}{2}$$

and that sin $\theta$ of Fig. 2 is given by the relationship $$-\sin\theta=\frac{x-1/x}{x+1/x}$$

with $$x=\frac{\omega}{\omega_0}=\frac{\omega_1}{\omega_0}+\frac{\Delta\omega}{\omega_0}=K\left[1+\frac{\Delta\omega}{\omega_1}\right]$$

where $\omega_1$, is the mean pulsation of the frequency modulated wave, $\omega_0$ the resonance pulsation, $\Delta\omega$ the instantaneous frequency deviation, and where $$K=\frac{\omega_1}{\omega_0}$$

For a sinusoidal modulation $$\Delta\omega=\Delta\hat{\omega}\cos\Omega t$$

in which $\Omega$ is the pulsation of the modulating frequency.

It will thus be seen that if $$\frac{r'}{R}<\frac{1}{5}$$

most of the conditions previously explained are satisfied at all frequencies, from zero frequency up to a higher limit, which is attained when each induction element $\lambda$ behaves no longer as an inductance but as a parallel-connected inductance-capacity unit, and each capacity $\gamma$ no longer as a pure capacity, but as a series-connected capacity-inductance unit. A more developed calculation shows moreover that if the natural frequency of these units is practically the same say $m\omega_0$ ($m$ being a coefficient higher than 1), the effects due to the parasitic reactances are negligible when $m$ is sufficiently large, and in practice said upper limit may be fixed for example at 1/5 or 1/10 of said natural frequency according to the degree of precision to be obtained. The discriminated potential being proportional to $$\theta=\frac{x-1/x}{x+1/x}$$

can be developed as a function of $$\frac{\Delta\omega}{\omega_1}$$

thus determining the rate of harmonics based on the fundamental term for a modulation of sinusoidal frequency at the input. This is summarized in the following table:

| $K^3$ | $\theta_0$ | fundamental | 2nd harmonic | 3rd harmonic | 4th harmonic |
|---|---|---|---|---|---|
| | *Degrees* | | | | |
| 1/3 | 30 | $\frac{3}{4}\frac{\Delta\omega}{\omega_1}$ | $\frac{3}{32}\left(\frac{\Delta\omega}{\omega_1}\right)^3$ | $\frac{1}{12}\left(\frac{\Delta\omega}{\omega_1}\right)^2$ | $\frac{3}{64}\left(\frac{\Delta\omega}{\omega_1}\right)^3$ |
| 7 | 0 | $\frac{\Delta\omega}{\omega_1}$ | $\frac{-7}{4}\left(\frac{\Delta}{\omega_1}\right)$ | 0 | -------- |
| $\frac{4}{3}$ | −8 | $\frac{48}{49}\frac{\Delta\omega}{\omega_1}$ | $\frac{-9}{28}\left(\frac{\Delta\omega}{\omega_1}\right)$ | $\frac{2}{21}\left(\frac{\Delta\omega}{\omega_1}\right)^2$ | -------- |
| 3 | −30 | $\frac{3}{4}\frac{\Delta\omega}{\omega_1}$ | $\frac{-7}{2}\left(\frac{\Delta\omega}{\omega_1}\right)$ | $\frac{3}{4}\left(\frac{\Delta\omega}{\omega_1}\right)^2$ | -------- |

The above table brings out the importance of regulating the bridge on the pulsation $$\omega_0=\sqrt{3\omega_1}$$

corresponding to $$K^2=\frac{1}{3}$$

and to $\theta_0=30°$ (Fig. 2), $$\theta_0+\frac{\pi}{2}$$

being the angle of $\overrightarrow{AB}$ with $\overrightarrow{AO}$ in the absence of frequency modulation.

It will thus be seen that under these conditions the most important harmonic is the third and that its relative value is $$\frac{1}{12}\left(\frac{\Delta\omega}{\omega_1}\right)^2$$

This rate is less than 1/1000 for a relative deviation of 10% and has a value of 1/300 for a relative deviation of 20% that is, respectively, more than 60 decibels and 50 decibels.

If the action of the limiter introduces certain harmonics at high frequency and if the discriminator is regulated as previously set forth, the high frequency harmonics of the second and third order will correspond respectively to $$K^2=\frac{4}{3}$$

and $K^2=3$; the table thus gives the values of the low frequency harmonics generated in this manner and based on the corresponding fundamental. It will be seen that it is possible thus to produce a very aperiodic discriminator since it is possible to discriminate, besides the normal frequency modulated wave, harmonic frequency modulations of the same relative width of band.

Figure 4:
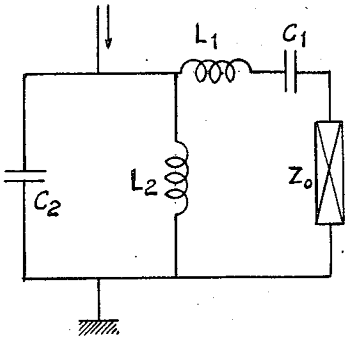
Fig. 4 shows a form of filter for use in conjunction with the apparatus of Fig. 3.

It may be desirable to have the circuits of the discriminator preceded by a filter of harmonics, which of course must not change appreciably the transmitted amplitude. This filter may be constructed in accordance with the installation of Fig. 4 comprising the inductances $L_1$, $L_2$ and the capacities $C_1$, $C_2$ and where $Z_0$ is the impedance between O and D of Fig. 3; this impedance is also R. Otherwise the circuit of Fig. 4 has the dimensions to satisfy the relations $$L_2C_2=L_1C_1=\frac{1}{\omega_1^2}$$

that is to say that it is tuned to the mean frequency of the frequency modulated wave, and $L_1=0.5C_2R^2$. Such a circuit gives at the terminals of $Z_0$ a very flat response curve as a function of the frequency. Particularly we can make $$\frac{L_1\omega_1}{R}=\frac{L_2\omega_1}{R}=0.7$$

that is $L_1=L_2=0.5.C_2R^2=0.5C_1R^2$.

Figure 5:
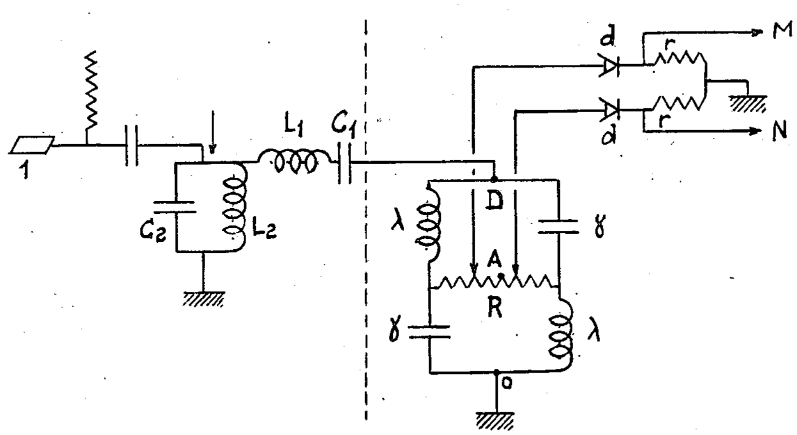
Fig. 5 is a general diagram showing how the apparatus of Fig. 3 may be incorporated into a conventional circuit of the type shown in Fig. 1.

Fig. 5 shows by way of a non-limiting example a discriminator according to the invention. In this figure we find again, with the same reference characters, the elements presented before in the preceding figures: 1 designates the anodic circuit of the limiter; the unit $L_1C_1L_2C_2$ constitutes the cell of the harmonics filter; $\lambda$ and $\gamma$ are the inductances and capacities of the bridge, the diagonal of which contains the resistance R, $d$ and $r$ the detectors and the load resistances, M and N the points to which the detected potentials are applied.

What I claim is:

A frequency discriminator which comprises in combination a frequency responsive network of the bridge-type wherein two opposite arms include substantially identical capacitances and two other opposite arms include substantially identical inductances, means for applying frequency modulated currents of a constant intensity to one diagonal of the bridge, means for grounding one terminal of the same diagonal, a resistor connected in the other diagonal of said bridge and having a resistance substantially equal to $$R=\sqrt{\frac{L}{C}}$$

wherein L and C are the values of the above-mentioned inductance and capacitance respectively, two taps on said resistor symmetrically disposed with respect to the mid-point thereof so as to provide between said mid-point and either tap a resistance whose value is less than R/5, means for picking up the alternating voltages existing between said taps and the ground and rectifying them separately, means for opposing to one another the two electrified voltages thus obtained and means for picking up the difference of said voltages, said difference being substantially proportional to the deviation of the instantaneous frequency from the mean frequency of said currents.

HENRI CHIREIX.

REFERENCES CITED

The following references are of record in the file of this patent:

UNITED STATES PATENTS

| Number | Name | Date |
|---|---|---|
| 2,151,127 | Logan | Mar. 21, 1939 |
| 2,192,959 | Ballard | Mar. 12, 1940 |
| 2,243,702 | Hansell | May 27, 1941 |
| 2,264,724 | Schonfeld | Dec. 2, 1941 |
| 2,332,811 | Rankin | Oct. 26, 1943 |
| 2,378,373 | Sprague | June 12, 1945 |